(12) United States Patent
Chang

(10) Patent No.: US 6,608,555 B1
(45) Date of Patent: Aug. 19, 2003

(54) VEHICLE SECURITY SYSTEM

(75) Inventor: Apin Chang, Chung-Ho (TW)

(73) Assignee: Wintecronics Co., Ltd., Taipei Hsien (TW)

( * ) Notice: Subject to any disclaimer, the term of this patent is extended or adjusted under 35 U.S.C. 154(b) by 0 days.

(21) Appl. No.: 10/041,126

(22) Filed: Jan. 7, 2002

(30) Foreign Application Priority Data

Nov. 14, 2001 (TW) ...................................... 90219607 U

(51) Int. Cl.[7] .................................................. B60Q 1/00
(52) U.S. Cl. .................. 340/439; 340/310.01; 340/428; 340/441; 307/10.2
(58) Field of Search ........................... 340/310.01, 426, 340/428, 429, 430, 438, 439, 441; 307/10.2

(56) References Cited

U.S. PATENT DOCUMENTS

| | | | | |
|---|---|---|---|---|
| 3,925,763 A | * | 12/1975 | Wadhwani et al. | 340/825.36 |
| 4,463,341 A | * | 7/1984 | Iwasaki | 340/310.01 |
| 5,128,650 A | * | 7/1992 | Peters et al. | 340/428 |
| 5,307,048 A | * | 4/1994 | Sonders | 340/426 |
| 5,644,172 A | * | 7/1997 | Hodges | 307/10.5 |
| 5,745,027 A | * | 4/1998 | Malville | 340/310.01 |
| 6,249,216 B1 | * | 6/2001 | Flick | 340/426 |
| 6,310,408 B1 | * | 10/2001 | Hermann | 307/10.1 |
| 6,326,704 B1 | * | 12/2001 | Breed et al. | 307/9.1 |

* cited by examiner

Primary Examiner—Daniel J. Wu
Assistant Examiner—Lam P Pham
(74) Attorney, Agent, or Firm—Pitney, Hardin, Kipp & Szuch LLP

(57) ABSTRACT

A vehicle security system includes a detector circuit cluster, an alarm circuit cluster and a host device, all connected to a common power supply line. The detector circuit cluster includes a detector circuit for detecting a current state of a respective component of the vehicle. The detector circuit can receive a status request signal and transmit a status response signal corresponding to the detected state of the respective component. The alarm circuit cluster is enabled upon receipt of an alarm enable signal for generating an alarm output. The host device can transmit the status request signal for the detector circuit, receive the status response signal from the detector circuit, and selectively transmit the alarm enable signal in accordance with the status response signal.

7 Claims, 3 Drawing Sheets

| CODE | DEFINITION |
|---|---|
| 00000001 | Status Request for First Detector |
| 00000010 | First State Status Response from First Detector |
| 00000011 | Second State Status Response from First Detector |
| 00000100 | Status Request for Second Detector |
| 00000101 | First State Status Response from Second Detector |
| 00000110 | Second State Status Response from Second Detector |
| 00000111 | Status Request for Third Detector |
| 00001000 | First State Status Response from Third Detector |
| 00001001 | Second State Status Response from Third Detector |
| 00001010 | Alarm Enable for First Actuator |
| 00001011 | Alarm Enable for Second Actuator |
| 00001100 | Alarm Enable for Third Actuator |

FIG. 3

VEHICLE SECURITY SYSTEM

CROSS-REFERENCE TO RELATED APPLICATION

This application claims priority of Taiwanese application. no. 90219607, filed on Nov. 14, 2001.

BACKGROUND OF THE INVENTION

1. Field of the Invention

The invention relates to a vehicle security system, more particularly to one using alternating current signal transmission through a power supply line.

2. Description of the Related Art

Most vehicles are currently equipped with a vehicle security system in order to guard against vehicle theft. FIG. 1 illustrates a vehicle 2 equipped with a conventional vehicle security system 1. The conventional vehicle security system 1 comprises a host device 10 that controls all anti-theft operations, a detector circuit cluster 11 that detects different conditions of vehicle theft, and an alarm circuit cluster 12.

The detector circuit cluster 11 is connected to the host device 10 and is adapted to detect a current status of different components of the vehicle 2 for detecting signs of vehicle theft. The detector circuit cluster 11 includes an engine hood detector circuit 111 adapted to detect unauthorized opening of an engine hood 21 of the vehicle 2, a trunk hood detector circuit 112 adapted to detect unauthorized opening of a trunk hood 22 of the vehicle 2, a hand brake detector circuit 113 adapted to detect unauthorized movement of a hand brake 231 of the vehicle 2, door detector circuits 114 adapted to detect unauthorized opening of doors 24 of the vehicle 2, and a lock-pick detector circuit 115 adapted to detect insertion of a lock-pick into an ignition keyhole 25 of the vehicle 2. The conventional detector circuits 111–115 included in the detector circuit cluster 11 are in the form of switches that open and close in accordance with the current status of the respective component of the vehicle 2. Because each detector circuit 111–115 is connected to a voltage source, the host device 10 can determine the presence of unauthorized operation of the vehicle 2 by monitoring the voltage signals from the detector circuits 111–115.

The alarm circuit cluster 12 is connected to and controlled by the host device 10 to generate an alarm output in the event that unauthorized operation of the vehicle 2 was detected in accordance with the voltage signals from the detector circuit cluster 11. In general, the alarm output may be a visual output or an audible output. Since the vehicle 2 is equipped with a horn 26, exterior lighting 27 and interior lighting 28, the alarm circuit cluster 12 includes actuators connected to and enabled by the host device 10 to activate the horn 26, the exterior lighting 27 and interior lighting 28. Therefore, when the host device 10 detects unauthorized operation of the vehicle 2 in accordance with the voltage signals from the detector circuits 111–115, it will enable the alarm circuit cluster 12 so as to activate the horn 26, the exterior lighting 27 and the interior lighting 28, thereby deterring theft.

However, when mounting the conventional vehicle security system 1 on the vehicle 2, the detector circuits 111–115 and the alarm circuit cluster 12 require dedicated connecting lines for connection to the host device 10. In other words, a large amount of connecting lines are required to mount the conventional vehicle security system 1 on the vehicle 2. The mounting process is tedious, and the layout of the dedicated connecting lines is complicated. Furthermore, in the case that the vehicle security system 1 is not an original component of the vehicle 2, the mounting process will require rewiring of the vehicle circuitry, thereby further increasing the difficulty in mounting the conventional vehicle security system 1.

It is noted that the difficulty in mounting the conventional vehicle security system 1 will be greatly reduced if the existing vehicle circuitry can be used for signal transmission among the host device 10, the detector circuit cluster 11 and the alarm circuit cluster 12. Most components of the vehicle 2 require electric power for operation and are thus connected to the battery 29 via a respective power supply line. However, these power supply lines are used solely for dc power distribution. Even if the existing power supply lines are used to connect the host device 10 to the detector circuit cluster 11 in the conventional vehicle security system 1, the host device 10 will be unable to distinguish the voltage signals from the detector circuits 111–115 such that the host device 10 will be unable to detect unauthorized operation of the vehicle 2.

SUMMARY OF THE INVENTION

Therefore, the object of the present invention is to provide a vehicle security system that uses alternating current signal transmission through a power supply line to simplify the vehicle circuitry and to facilitate the mounting process.

Accordingly, the vehicle security system of this invention is adapted for use in a vehicle having a power supply and a power supply line connected to the power supply. The vehicle security system comprises a detector circuit cluster, an alarm circuit cluster and a host device.

The detector circuit cluster includes a plurality of detector circuits adapted to detect a current state of a respective component of the vehicle and adapted to be connected to the power supply line. Each of the detector circuits is capable of receiving a status request signal unique thereto via the power supply line, and transmitting a status response signal unique thereto and corresponding to the detected state of the respective component via the power supply line in response to the status request signal.

The alarm circuit cluster is adapted to be connected to the power supply line and is capable of receiving an alarm enable signal distinct from the status request and status response signals via the power supply line. The alarm circuit cluster is enabled so as to generate an alarm output upon receipt of the alarm enable signal.

The host device is adapted to be connected to the power supply line, and is capable of transmitting the status request signals for the detector circuits in sequence via the power supply line, receiving the status response signals from the detector circuits via the power supply line, and selectively transmitting the alarm enable signal to the alarm circuit cluster via the power supply line in accordance with the status response signals from the detector circuits.

Each of the status request signals, the status response signals and the alarm enable signal is in the form of an alternating current signal.

Because the status request signals, the status response signals and the alarm enable signal are alternating current signals that are distinct from the power signal normally distributed through the power supply line, signal transmission among the detector circuit cluster, the alarm circuit cluster and the host device can be carried out via the power supply line to simplify the vehicle circuitry and to facilitate installation of the vehicle security system of this invention.

BRIEF DESCRIPTION OF THE DRAWINGS

Other features and advantages of the present invention will become apparent in the following detailed description of the preferred embodiment with reference to the accompanying drawings, of which:

FIG. 3 is a table of binary codes for different alternating current signals used in the vehicle security system of the preferred embodiment.

DETAILED DESCRIPTION OF THE PREFERRED EMBODIMENT

Vehicles are usually equipped with a power supply, such as a battery, to provide the requisite power for operating most of their components. Since the power supply of a vehicle is a direct current (dc) power supply, the power supply is connected to the different components of the vehicle via positive and negative power supply lines.

Figure 1:
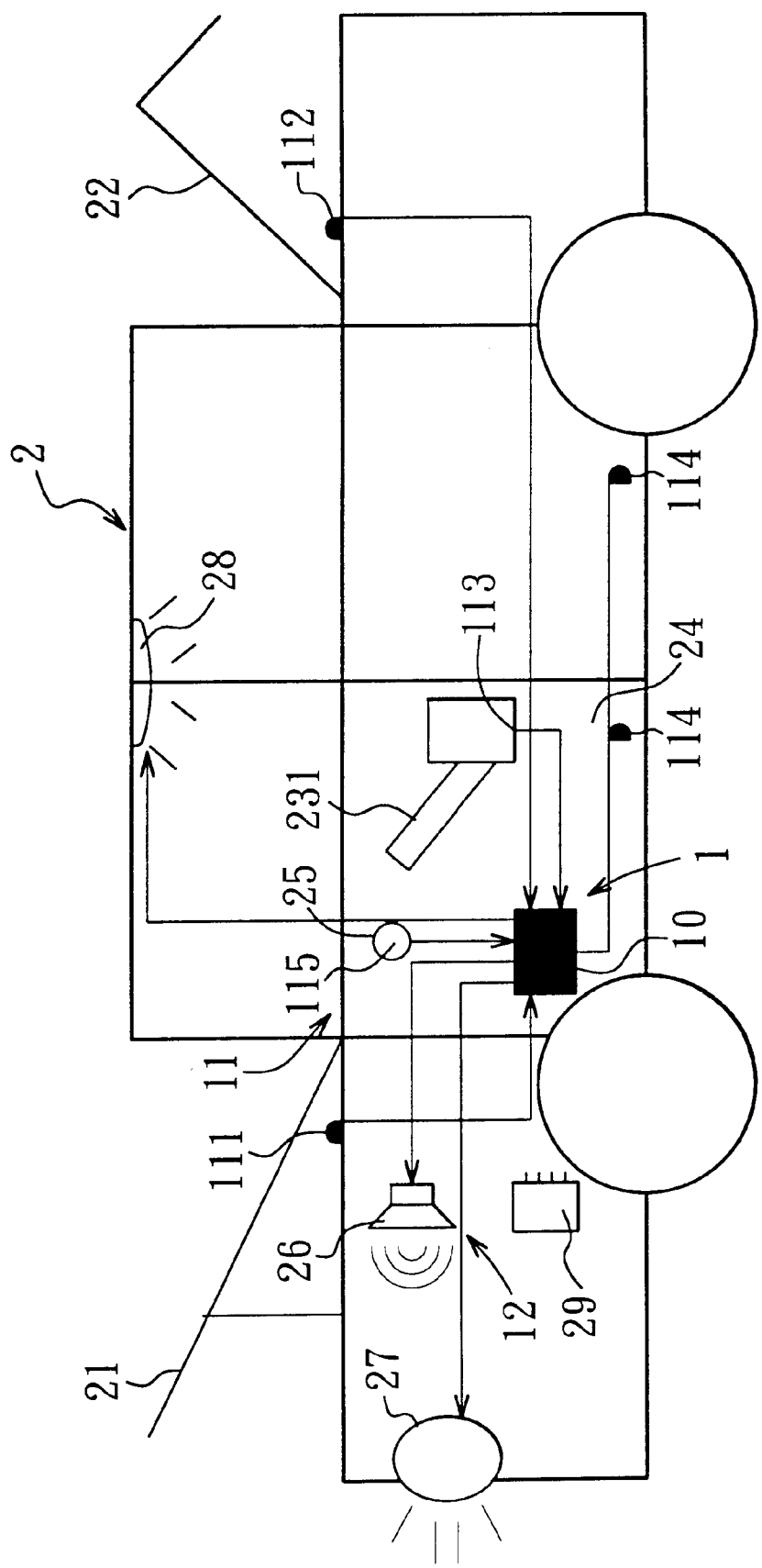
FIG. 1 is a schematic view of a vehicle that is equipped with a conventional vehicle security system.
Figure 2:
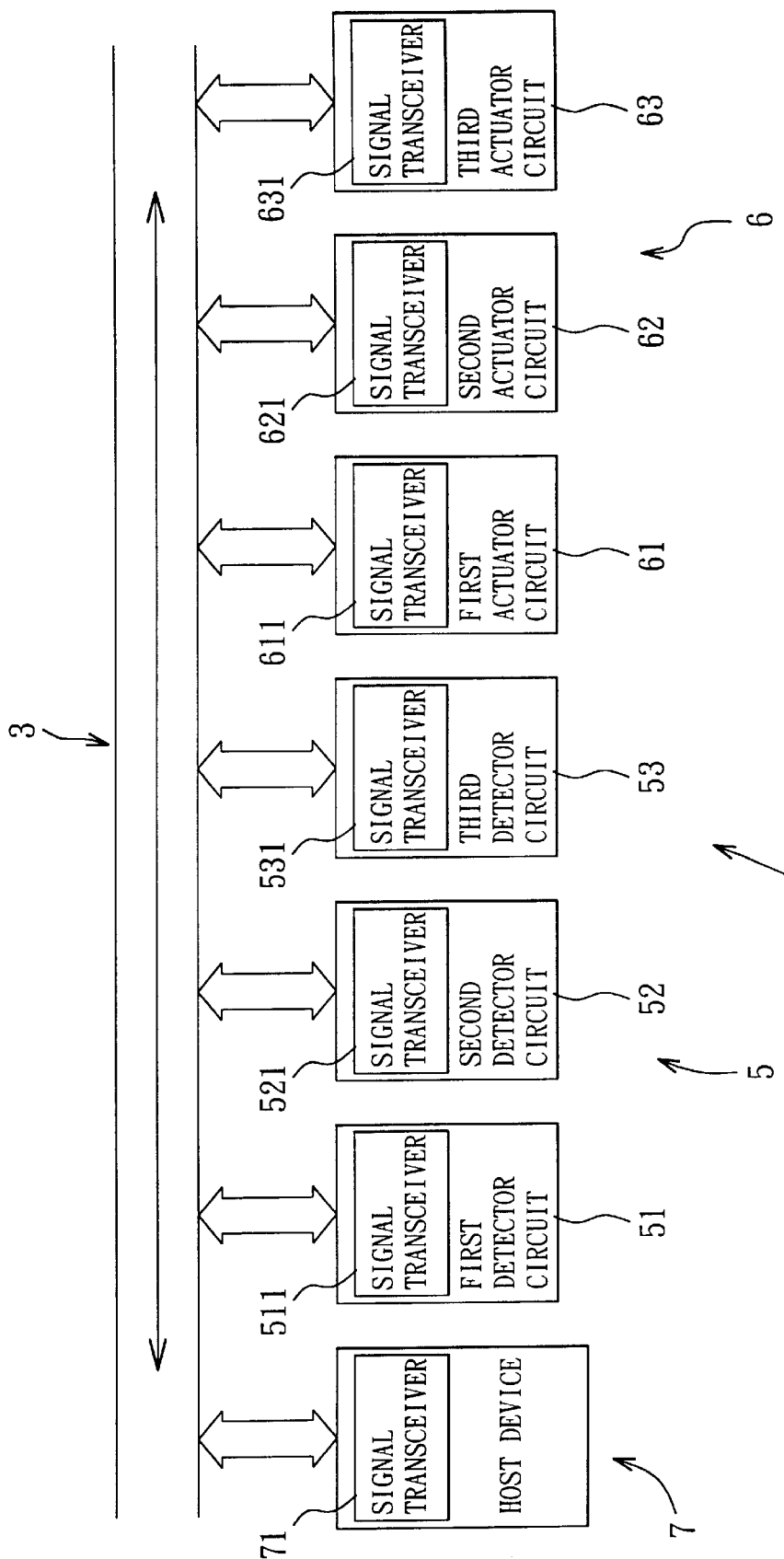
FIG. 2 is a schematic circuit block diagram of the preferred embodiment of a vehicle security system according to the present invention.

FIG. 2 illustrates the preferred embodiment of a vehicle security system 4 according to the present invention. The vehicle security system 4 uses the positive power supply line 3 for signal transmission, and includes a detector circuit cluster 5, an alarm circuit cluster 6, and a host device 7.

The detector circuit cluster 5 includes a plurality of detector circuits 51–53 adapted to detect a current state of a respective component of the vehicle and adapted to be connected to the positive power supply line 3. Each of the detector circuits 51–53 is provided with a signal transceiver 511, 521, 531 so as to be capable of receiving and transmitting alternating current (ac) signals, and is capable of switching from a first state to a second state according to the detected state of the respective component. In this embodiment, the detector circuit cluster 5 includes first detector circuits 51 (only one is shown), a second detector circuit 52, and a third detector circuit 53, which are connected to the positive power supply 3. The first detector circuits 51 correspond in number to the vehicle doors, and are disposed respectively at appropriate positions relative to the vehicle doors. The first detector circuits 51 are capable of switching from the first state to the second state in response to detected movement of the respective vehicle door. The second detector circuit 52 is disposed at an appropriate position relative to the vehicle engine hood, and is capable of switching from the first state to the second state in response to detected movement of the vehicle engine hood. The third detector circuit 53 is disposed at an appropriate position relative to the vehicle hand brake, and is capable of switching from the first state to the second state in response to detected movement of the vehicle hand brake. Although the detector circuit cluster 5 in this embodiment includes only detector circuits 51–53 corresponding to the vehicle doors, the vehicle engine hood and the vehicle hand brake, it is evident to those skilled in the art that the detector circuit cluster 5 can further include other detector circuits for detecting unauthorized opening of a vehicle trunk hood, for detecting insertion of a lock-pick into an ignition keyhole, etc.

The alarm circuit cluster 6 is adapted to be connected to the positive power supply line 3, is capable of receiving and transmitting ac signals, and is capable of generating an alarm output under the control of the host device 7. In this embodiment, the alarm circuit cluster 6 includes a first actuator circuit 61, a second actuator circuit 62 and a third actuator circuit 63. Each actuator circuit 61, 62, 63 is provided with a respective signal transceiver 611, 621, 631 so as to be able to receive ac signals via the positive power supply line 3. The first actuator circuit 61 is connected to the vehicle horn. The second actuator circuit 61 is connected to exterior vehicle lighting. The third actuator circuit 61 is connected to interior vehicle lighting. Therefore, in response to alarm enable signals received from the host device 7 through the signal transceivers 611, 621, 631 via the positive power supply line 3, the actuator circuits 61, 62, 63 will be enabled so that visual and audible alarm outputs will be generated. Although the alarm circuit cluster 6 in this embodiment includes only actuator circuits 61, 62, 63, it is evident to those skilled in the art that the alarm circuit cluster 6 can further include actuator circuits associated with other vehicle components subject to the requirements of the designer.

The host device 7 is adapted to be connected to the detector circuits 51, 52, 53 and the actuator circuits 61, 62, 63 via the positive power supply line 3, and is provided with a signal transceiver 71 so as to be capable of transmitting status request signals for the detector circuits 51, 52, 53 in sequence via the power supply line 3, receiving status response signals from the detector circuits 51, 52, 53 via the power supply line 3, and selectively transmitting alarm enable signals to the alarm circuit cluster 6 via the power supply line 3 in accordance with the status response signals from the detector circuits 51, 52, 53.

Furthermore, since signal transmission among the host device 7, the alarm circuit cluster 6 and the detector circuit cluster 5 is conducted via the common positive power supply line 3, different ac signals may be present at the power supply line 3 simultaneously. It is thus imperative that the different ac signals may be distinguished from each other to prevent erroneous operation. To this end, each of the status request signals, the status response signals and the alarm enable signals includes an ac carrier modulated by an exclusive binary code having a unique definition. Each component 5, 6, 7 performs a specific task only upon receipt of the exclusive binary code. Communication between the host device 7 and each of the detector circuits 51, 52, 53 are interactive. That is, the host device 7 will first transmit a status request signal to the detector circuits 51, 52, 53 in sequence, and the detector circuits 51, 52 and 53 will transmit a respective status response signal to the host device 7 to reflect the current state (first or second state) of the respective component.

The operation of the preferred embodiment will be better understood with reference to the following illustrative example. Referring to FIG. 3, the various signals among the components 5, 6, 7 of the vehicle security system 4 include a low frequency ac carrier modulated by an 8-bit exclusive binary code. In the example of FIG. 3, the status request signal from the host device 7 to the first detector circuit 51 is assigned with the exclusive binary code 00000001, the status request signal from the host device 7 to the second detector circuit 52 is assigned with the exclusive binary code 00000100, the status request signal from the host device 7 to the third detector circuit 53 is assigned with the exclusive binary code 00000111, the alarm enable signal from the host device 7 to the first actuator circuit 61 is assigned with the exclusive binary code 00001010, the alarm enable signal from the host device 7 to the second actuator circuit 62 is assigned with the exclusive binary code 00001011, and the alarm enable signal from the host device 7 to the third actuator circuit 63 is assigned with the exclusive binary code 00001100.

When the host device 7 transmits the status request signal having the exclusive binary code 00000001 through the positive power supply line 3, all of the detector circuits 51–53 and actuator circuits 61–63 will receive and process the same. However, only the first detector circuit 51 will recognize this signal, causing it to respond to the host device 7 as to the current state of its associated vehicle door. If the first detector circuit 51 detects a first state (i.e., the associated vehicle door is closed), it will transmit a status response signal with the exclusive binary code 00000010 to the positive power supply line 3 through the signal transceiver 511. On the other hand, if the first detector circuit 51 detects a second state (i.e., the associated vehicle door is opened), it will transmit a status response signal with the exclusive binary code 00000011 to the positive power supply line 3 through the signal transceiver 511. Hence, the host device 7 will know through the signal transceiver 71 the current state of one of the vehicle doors upon receiving the status response signal with the exclusive binary code 00000010 or 00000011 from the first detector circuit 51.

The host device 7 then transmits the status request signal with the exclusive binary code 00000100 to the positive power supply line 3. The second detector circuit 52 will recognize this signal, causing it to respond to the host device 7 as to the current state of the vehicle engine hood. If the second detector circuit 52 detects a first state (i.e., the engine hood is closed), it will transmit a status response signal with the exclusive binary code 00000101 to the positive power supply line 3 through the signal transceiver 521. On the other hand, if the second detector circuit 52 detects a second state (i.e., the engine hood is opened), it will transmit a status response signal with the exclusive binary code 00000110 to the positive power supply line 3 through the signal transceiver 511. Hence, the host device 7 will know through the signal transceiver 71 the current state of the engine hood upon receiving the status response signal with the exclusive binary code 00000101 or 00000110 from the second detector circuit 52.

Thereafter, the host device 7 transmits a status request signal with the exclusive binary code 00000111 to the positive power supply line 3. The third detector circuit 53 will recognize this signal, causing it to respond to the host device 7 as to the current state of the vehicle hand brake. If the third detector circuit 53 detects a first state (i.e. the hand brake is not released), it will transmit a status. response signal with the exclusive binary code 00001000 to the positive power supply line 3 through the signal transceiver 531. On the other hand, if the third detector circuit 53 detects a second state (i.e. the hand brake is released) it will transmit a status response signal with the exclusive binary code 00001001 to the positive power supply line 3 through the signal transceiver 531. Hence, the host device 7 will know through the signal transceiver 71 the current state of the hand brake upon receiving the status response signal with the exclusive binary code 00001000 or 00001001 from the third detector circuit 53.

The host device 7 periodically polls the detector circuits 51, 52, 53 for status request. If any of the detector circuits 51, 52, 53 responds with a detected second state of the associated vehicle component (i.e., the host device 7 receives the status response signal with the exclusive binary code 00000011, 00000110 or 0001001), the host device 7 will transmit the alarm enable signals with the exclusive binary codes 00001010, 00001011 and 00001100 in sequence to the positive power supply line 3, thereby enabling the first, second and third actuator circuits 61, 62, 63 for generating an alarm output.

Accordingly, after the vehicle security system 4 is armed, the host device 7 periodically polls the detector circuits 51, 52, 53 for status request, and the detector circuits 51, 52 and 53 will transmit a status response signal that reflects the current state of the respective vehicle component. Therefore, the host device 7 will know the current state of the different vehicle components at any moment. When a change in the status response signal of any of the detector circuits 51, 52 or 53 is detected (i.e., the detector circuit switches from the first state to the second state), the host device 7 will then transmit the alarm enable signals for enabling the actuator circuits 61, 62, 63, thereby generating an alarm output for deterring theft.

It is noted that the code assignments and definitions as illustrated in this embodiment are subject to change in accordance with the actual requirements and should not be limited thereto.

It is further noted that ac signal transmission in the vehicle security system 4 of this invention is conducted through the existing positive power supply line 3 without signal loss or interference with other vehicle components. As such, when mounting the vehicle security system 4, there is no need to rewire the vehicle circuitry.

While the present invention has been described in connection with what is considered the most practical and preferred embodiment, it is understood that this invention is not limited to the disclosed embodiment but is intended to cover various arrangements included within the spirit and scope of the broadest interpretation so as to encompass all such modifications and equivalent arrangements.

I claim:
1. A vehicle security system for a vehicle having a power supply and a power supply line connected to the power supply, said vehicle security system comprising:
   a detector circuit cluster that includes a plurality of detector circuits adapted to detect a current state of a respective component of the vehicle and adapted to be connected to the power supply line, each of said detector circuits being capable of receiving a status request signal unique thereto via the power supply line, and transmitting a status response signal unique thereto and corresponding to the detected state of the respective component via the power supply line in response to the status request signal;
   an alarm circuit cluster adapted to be connected to the power supply line and capable of receiving an alarm enable signal distinct from the status request and status response signals via the power supply line, said alarm circuit cluster being enabled to generate an alarm output upon receipt of the alarm enable signal; and
   a host device adapted to be connected to the power supply line, and capable of transmitting the status request signals for said detector circuits in sequence via the power supply line, receiving the status response signals from said detector circuits via the power supply line, and selectively transmitting the alarm enable signal to said alarm circuit cluster via the power supply line in accordance with the status response signals from said detector circuits;
   wherein each of the status request signals, the status response signals and the alarm enable signal is in the form of an alternating current signal.
2. The vehicle security system as claimed in claim 1, wherein said detector circuits include at least one of:
   a vehicle door detector adapted to detect unauthorized opening of a door of the vehicle;
   an engine hood detector adapted to detect unauthorized opening of an engine hood of the vehicle;

a trunk hood detector adapted to detect unauthorized opening of a trunk hood of the vehicle;

a hand brake detector adapted to detect unauthorized movement of a hand brake of the vehicle; and a lock-pick detector adapted to detect insertion of a lock-pick into a keyhole of the vehicle.

3. The vehicle security system as claimed in claim 1, wherein said alarm circuit cluster includes:

a vehicle horn actuator adapted to activate a vehicle horn of the vehicle when enabled;

an exterior light actuator adapted to activate exterior lighting of the vehicle when enabled; and an interior light actuator adapted to activate interior lighting of the vehicle when enabled.

4. The vehicle security system as claimed in claim 1, wherein each of the status request signals, the status response signals and the alarm enable signal includes an alternating current carrier.

5. The vehicle security system as claimed in claim 4, wherein said alternating current carrier is a low frequency carrier.

6. The vehicle security system as claimed in claim 4, wherein each of the status request signals, the status response signals and the alarm enable signal further includes an exclusive binary code for modulating said alternating current carrier.

7. The vehicle security system as claimed in claim 6, wherein the binary code of each of the status response signals is one of a first code to indicate a detected normal state of the respective component, and a second code to indicate a detected abnormal state of the respective component.

* * * * *